(12) United States Patent
Khojastepour et al.

(10) Patent No.: US 10,292,054 B2
(45) Date of Patent: May 14, 2019

(54) ENABLING TECHNOLOGIES FOR LTE ON UNLICENSED SPECTRUM

(71) Applicant: NEC Laboratories America, Inc., Princeton, NJ (US)

(72) Inventors: Mohammad Khojastepour, Lawrenceville, NJ (US); Eugene Chai, Monmouth Jnctn, NJ (US); Karthikeyan Sundaresan, Manalapan, NJ (US); Sampath Rangarajan, Bridgewater, NJ (US)

(73) Assignee: NEC Corporation, Tokyo (JP)

(*) Notice: Subject to any disclaimer, the term of this patent is extended or adjusted under 35 U.S.C. 154(b) by 28 days.

(21) Appl. No.: 15/422,085

(22) Filed: Feb. 1, 2017

(65) Prior Publication Data

US 2017/0265083 A1 Sep. 14, 2017

Related U.S. Application Data

(60) Provisional application No. 62/307,907, filed on Mar. 14, 2016.

(51) Int. Cl.
| | |
|---|---|
| *H04W 16/14* | (2009.01) |
| *H04W 28/26* | (2009.01) |
| *H04W 74/00* | (2009.01) |
| *H04W 74/08* | (2009.01) |
| *H04L 27/26* | (2006.01) |
| *H04W 84/12* | (2009.01) |
| *H04W 88/10* | (2009.01) |
| *H04W 72/04* | (2009.01) |

(52) U.S. Cl.
CPC ........... *H04W 16/14* (2013.01); *H04W 28/26* (2013.01); *H04W 74/006* (2013.01); *H04W 74/0816* (2013.01); *H04L 27/2601* (2013.01); *H04W 72/0453* (2013.01); *H04W 84/12* (2013.01); *H04W 88/10* (2013.01)

(58) Field of Classification Search
CPC . H04W 16/14; H04W 74/0816; H04W 28/26; H04W 74/006; H04W 72/0453; H04W 88/10; H04W 84/12; H04L 27/2601
See application file for complete search history.

(56) References Cited

U.S. PATENT DOCUMENTS

| | | | |
|---|---|---|---|
| 2016/0095110 A1* | 3/2016 | Li | H04W 72/1215 370/329 |
| 2016/0227578 A1* | 8/2016 | Lee | H04W 74/004 |
| 2016/0249358 A1* | 8/2016 | Li | H04W 72/0453 |

\* cited by examiner

*Primary Examiner* — Thai Nguyen
(74) *Attorney, Agent, or Firm* — Joseph Kolodka

(57) ABSTRACT

Methods and a system are provided for enabling coexistence of WIFI and Long Term Evolution (LTE) in a wireless communication system. A method includes embedding in a data sequence, by a base station capable of transmitting and receiving LTE frames, a channel reservation packet that (i) is detectable by a WIFI receiver and (ii) reserves a particular one of a plurality of available unlicensed communication channels for a transmission duration of the data sequence. The method further includes transmitting, by the base station, the data sequence including the embedded channel reservation packet.

6 Claims, 8 Drawing Sheets

ENABLING TECHNOLOGIES FOR LTE ON UNLICENSED SPECTRUM

RELATED APPLICATION INFORMATION

This application claims priority to U.S. Provisional Pat. App. Ser. No. 62/307,907 filed on Mar. 14, 2016, incorporated herein by reference in its entirety.

BACKGROUND

Technical Field

The present invention relates to cellular communications and more particularly to enabling technologies for LTE on unlicensed spectrum.

Description of the Related Art

Currently, there is a lack of enabling technologies for LTE on unlicensed spectrum. For example, due to the different channel access methodologies employed by WIFI and LTE (that is, carrier sensing/notification in WIFI, and energy sensing alone in License Assisted-Access LTE (LAA-LTE)), WIFI transmission are often blocked by LAA-LTE. As such, there is a need for enabling technologies that enable coexistence of WIFI and LTE in a wireless communication system.

SUMMARY

According to an aspect of the present invention, a method is provided for enabling coexistence of WIFI and Long Term Evolution (LTE) in a wireless communication system. The method includes embedding in a data sequence, by a base station capable of transmitting and receiving LTE frames, a channel reservation packet that (i) is detectable by a WIFI receiver and (ii) reserves a particular one of a plurality of available unlicensed communication channels for a transmission duration of the data sequence. The method further includes transmitting, by the base station, the data sequence including the embedded channel reservation packet.

According to another aspect of the present invention, a system is provided for enabling coexistence of WIFI and Long Term Evolution (LTE) in a wireless communication system. The system includes a base station, capable of transmitting and receiving LTE frames. The base station is configured to embed, in a data sequence, a reservation packet that (i) is detectable by a WIFI receiver and (ii) reserves a particular one of a plurality of available unlicensed communication channels for a transmission duration of the data sequence. The base station is further configured to transmit the data sequence including the embedded reservation packet.

According to yet another aspect of the present invention, a method is provided for enabling coexistence of WIFI and Long Term Evolution (LTE) in a wireless communication system. The method includes sensing, by a base station capable of transmitting and receiving LTE frames, WIFI signals in each of a plurality of frequency bands. The plurality of frequency bands correspond to a plurality of unlicensed communication channels. The method further includes choosing, by the base station, only one of the plurality of frequency bands for a LTE transmission. The method also includes performing, by the base station, LTE transmissions in other ones of the plurality of frequency bands without WIFI sensing.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In an embodiment, the present invention is directed to Licensed-Assisted-Access LTE (LAA-LTE) in unlicensed spectrum. Given its shorter access time-scales compared to an alternate LTE-U mode, LAA-LTE is the more (WIFI) co-existence friendly mode that the 3GPP standards are currently pursuing. However, it has been demonstrated that the large asymmetry in the channel access methodologies employed by the two technologies (carrier sensing/notification in WIFI, energy sensing alone in LAA-LTE), can even result in LAA-LTE completely blocking WIFI transmissions, and causing significant degradation to either technologies from collisions.

In order to design an efficient LTE-LAA system, it is desirable to minimize the interference from WIFI on LTE and vice versa. A good approach is for an LTE node to reserve a channel such that WIFI nodes can understand and react to the reservation. One of the issues that is addressed by the present invention is the way to make such reservations under the constraint of the LTE systems.

Another issue addressed by the present invention is controlling allocated frequency bands for LTE transmission such that the overall weighted throughput of LTE and WIFI is maximized in either of the cases of with or without reservation of the frequency band.

In an embodiment, the present invention addresses the aforementioned asymmetry by providing a LTE-WIFI co-existence solution that integrates WIFI's carrier sensing/notification mechanisms into LTE, without any modifications to the LTE PHY standard. The present invention operates at the LTE base station and can be considered to include the following two key components:

(1) preamble embedding that embeds appropriate data into the LTE-subframes through an intelligent reverse engineering of the LTE PHY, so as to realize a WIFI PLCP preamble-header transmission over the air directly using the LTE PEW; and (2) scalable carrier sensing that employs a single WIFI interface and maximizes its carrier sensing benefits to all the unlicensed channels operating at the LTE node.

The present invention realizes the preceding through a synergistic application of carrier sensing and LTE traffic management across the unlicensed channels.

Regarding the first aforementioned key component, the same involves the generation of a CTS message which is understandable by WIFI systems by introducing virtual LTE users and carefully designing their transmit stream.

Regarding the second aforementioned key component, the same relates to designing scalable WIFI sensing in LTE which maximizes the benefit of carrier sensing in the cellular system by using an optimization algorithm to assign the sensing to a frequency band that maximizes this benefit as well as carefully choosing a subset of other frequency bands to be used by LTE without channel sensing.

Figure 1:
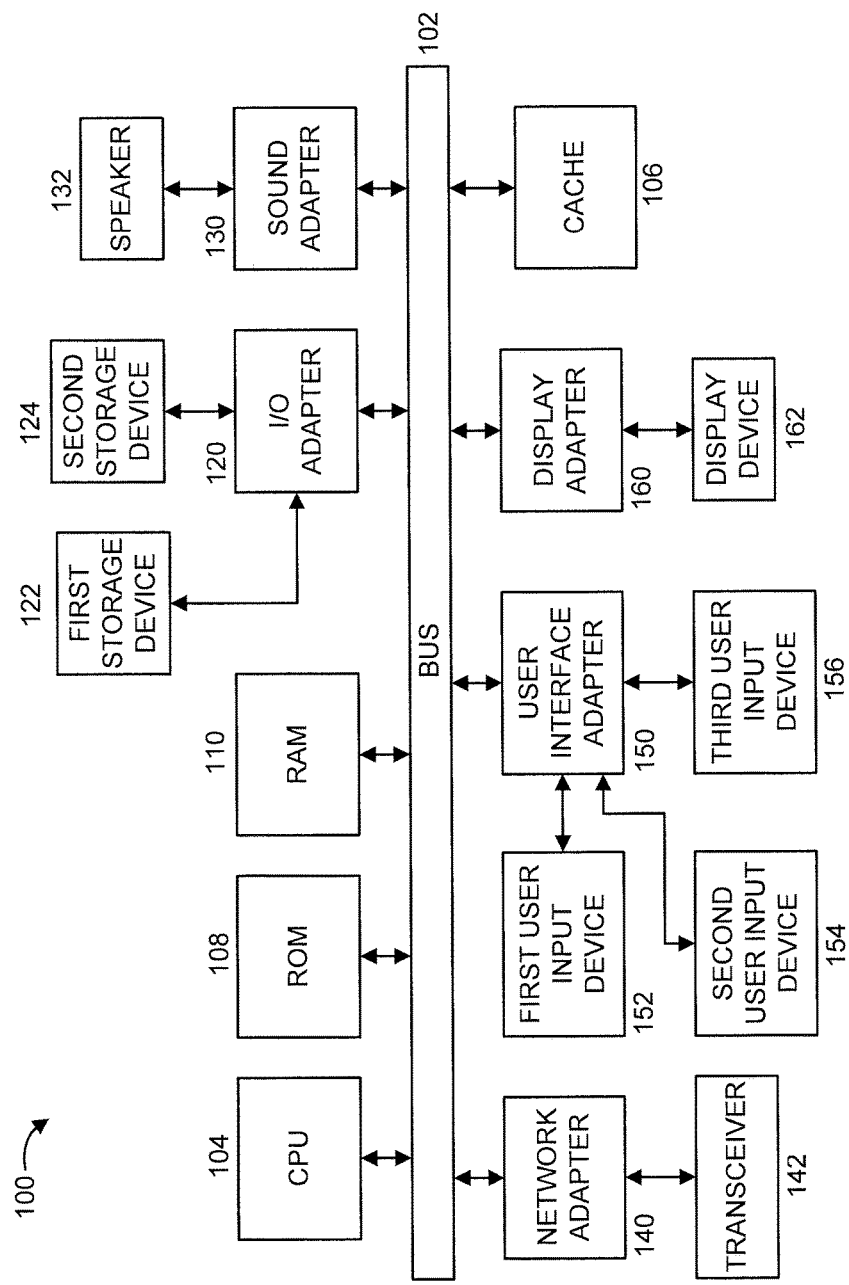
FIG. 1 shows a block diagram of an exemplary processing system 100 to which the present invention may be applied, in accordance with an embodiment of the present invention.

FIG. 1 shows a block diagram of an exemplary processing system 100 to which the invention principles may be applied, in accordance with an embodiment of the present invention. The processing system 100 includes at least one processor (CPU) 10.4 operatively coupled to other components via a system bus 102. A cache 106, a Read Only Memory (ROM) 108, a Random Access Memory (RAM) 110, an input/output (110) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to, system bus 102 by the sound adapter 130. The speaker 132 can be used to provide an audible alarm or some other indication relating to resilient battery charging in accordance with the present invention. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
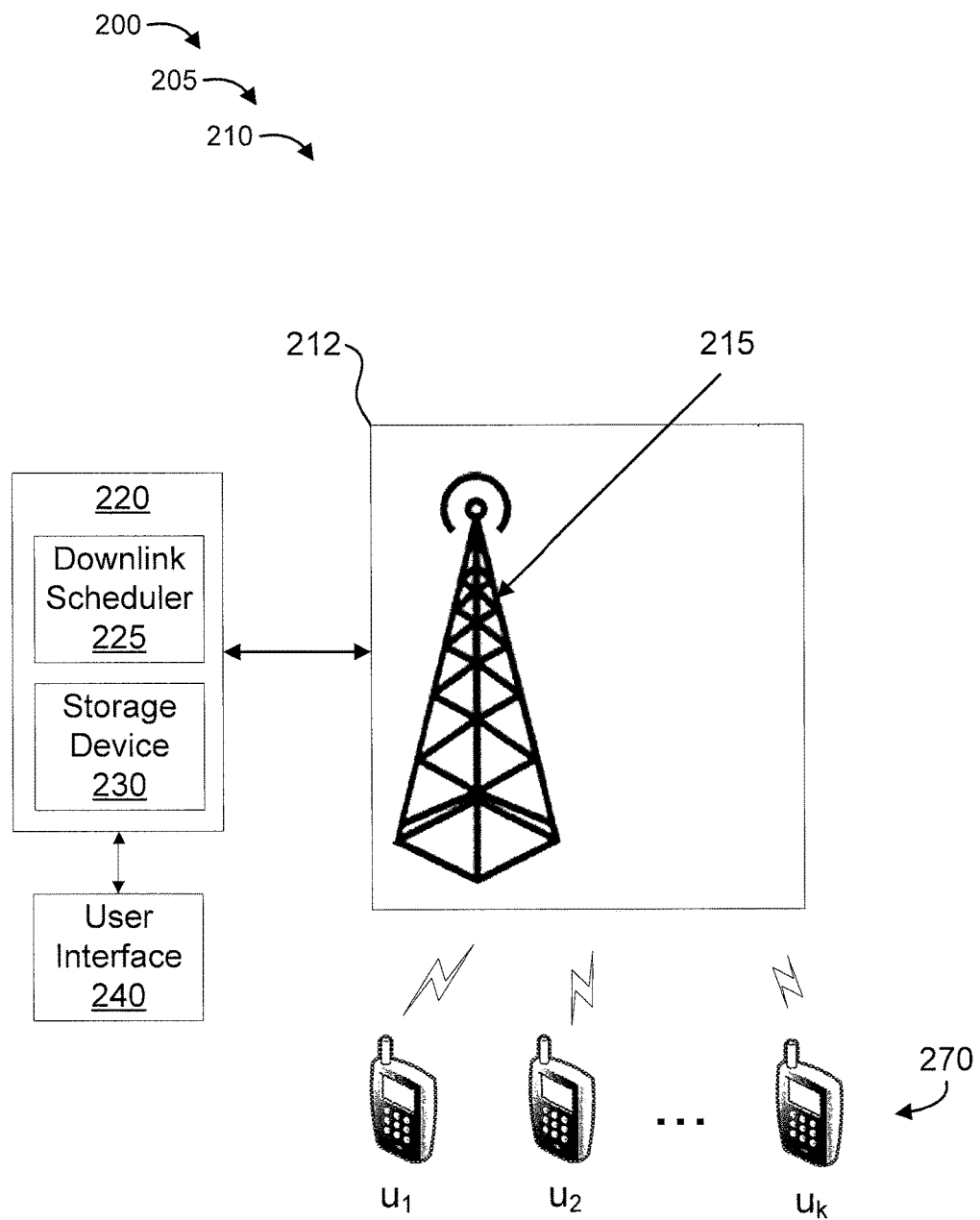
FIG. 2 shows a block diagram of an exemplary environment 200 to which the present invention can be applied, in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 3:
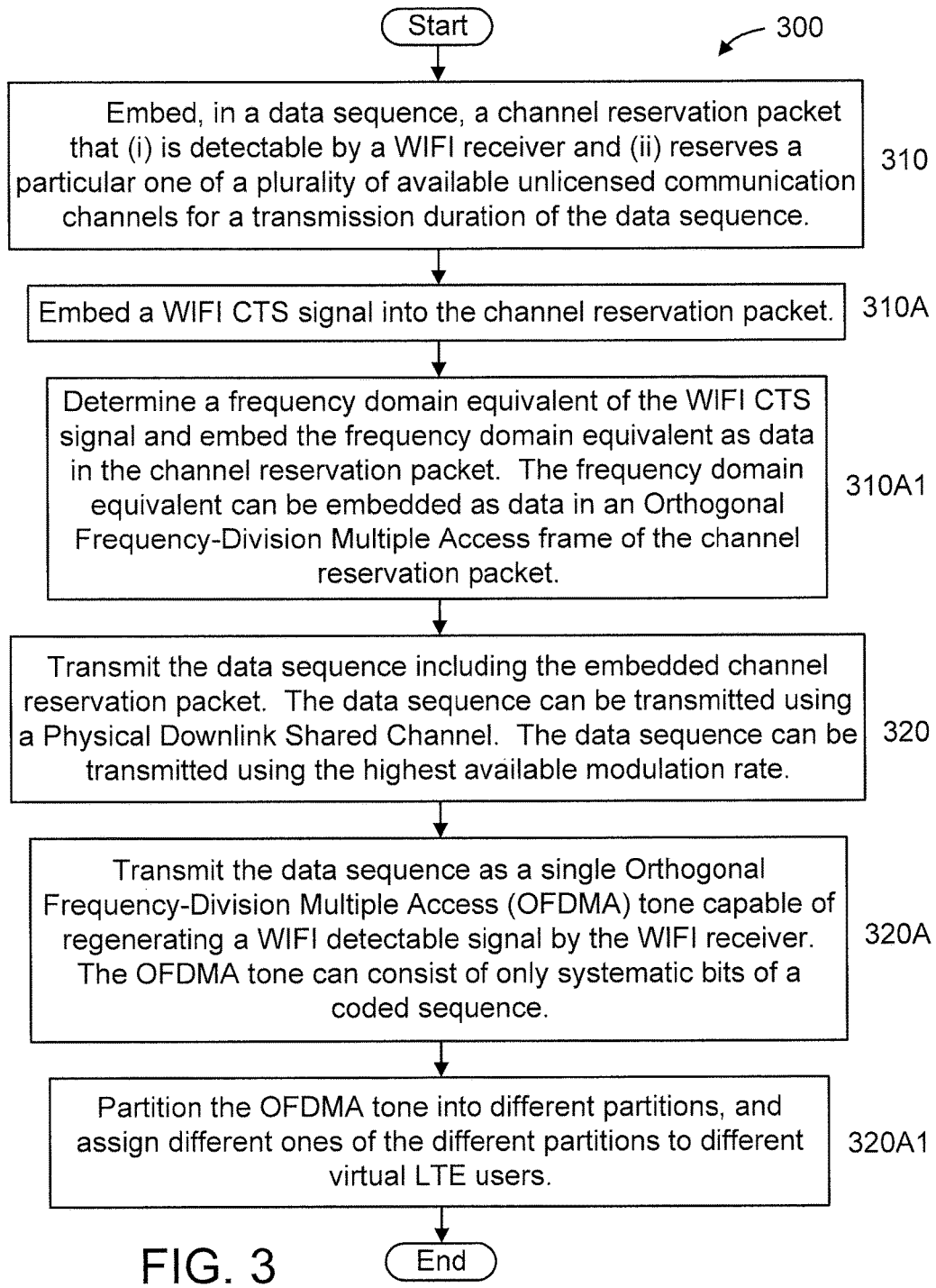
FIG. 3 shows a flow diagram of an exemplary method 300 for enabling coexistence of WIFI and Long Term Evolution (LTE) in a wireless communication system, in accordance with an embodiment of the present invention.
Figure 4:
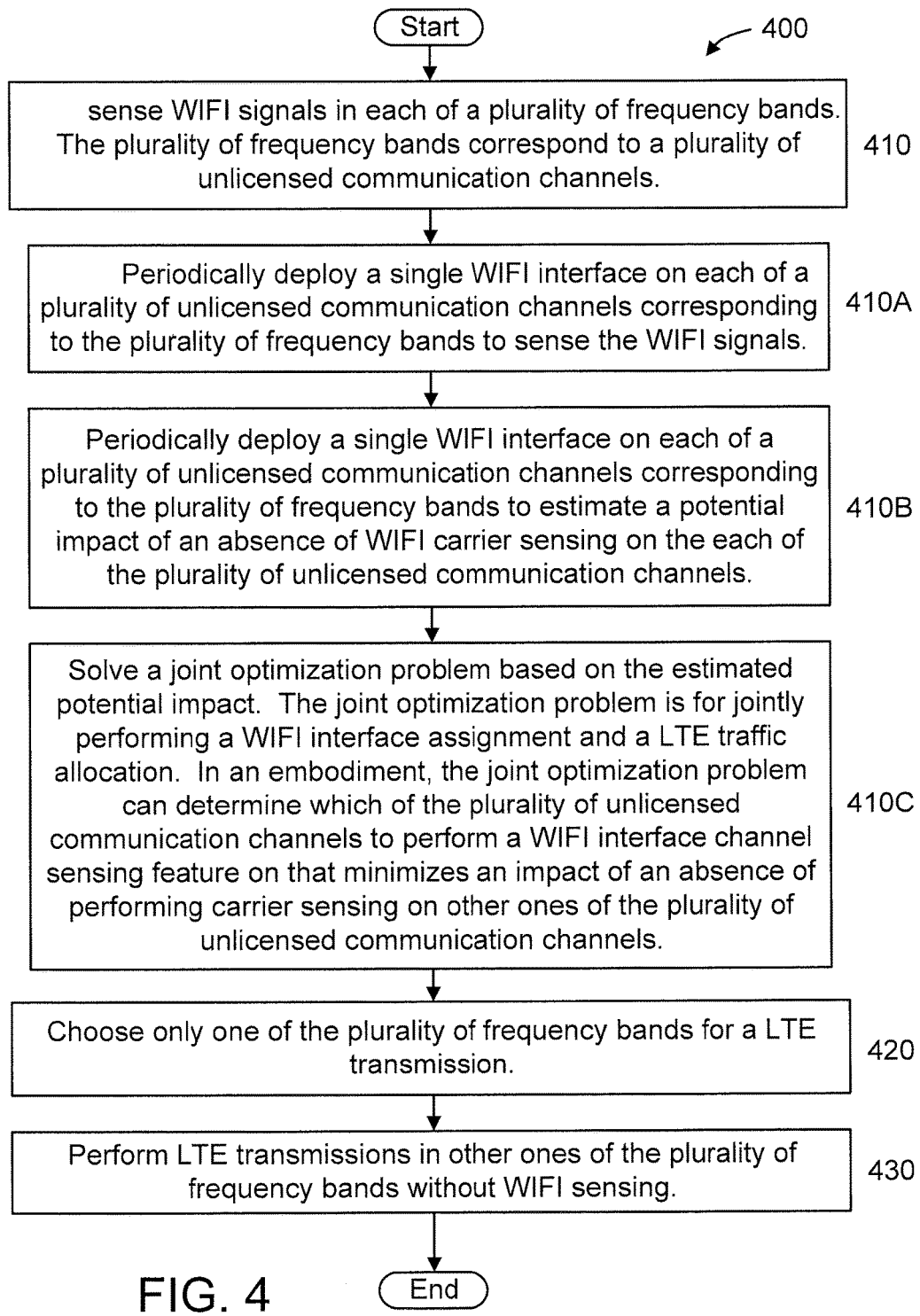
FIG. 4 shows a flow diagram of another exemplary method 400 for enabling coexistence of WIFI and Long Term Evolution (LTE) in a wireless communication system, in accordance with an embodiment of the present invention.
Figure 6:
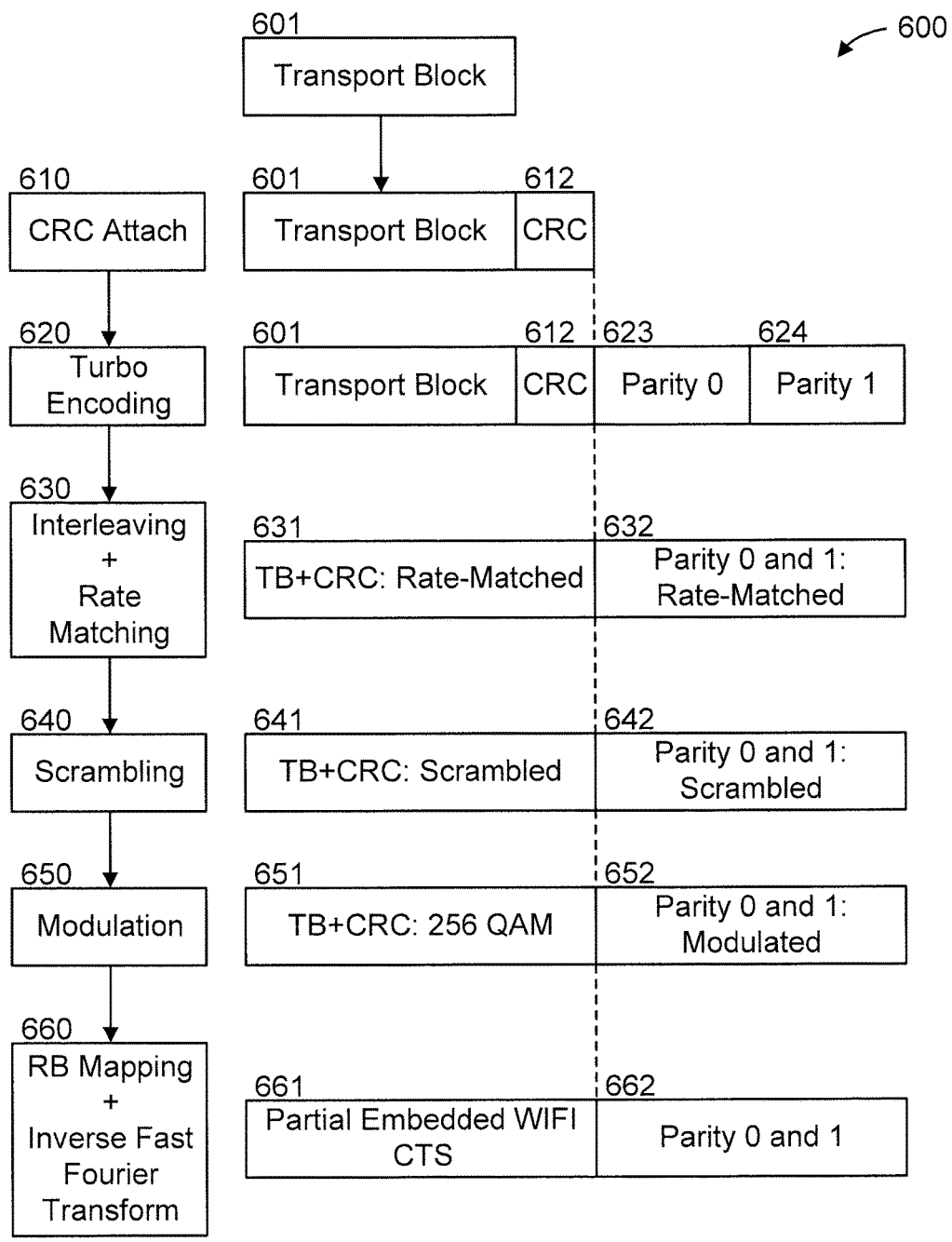
FIG. 6 shows a block diagram of an exemplary LTE PHY encoding 600 for each User Equipment (UE), in accordance with an embodiment of the present invention.
Figure 7:
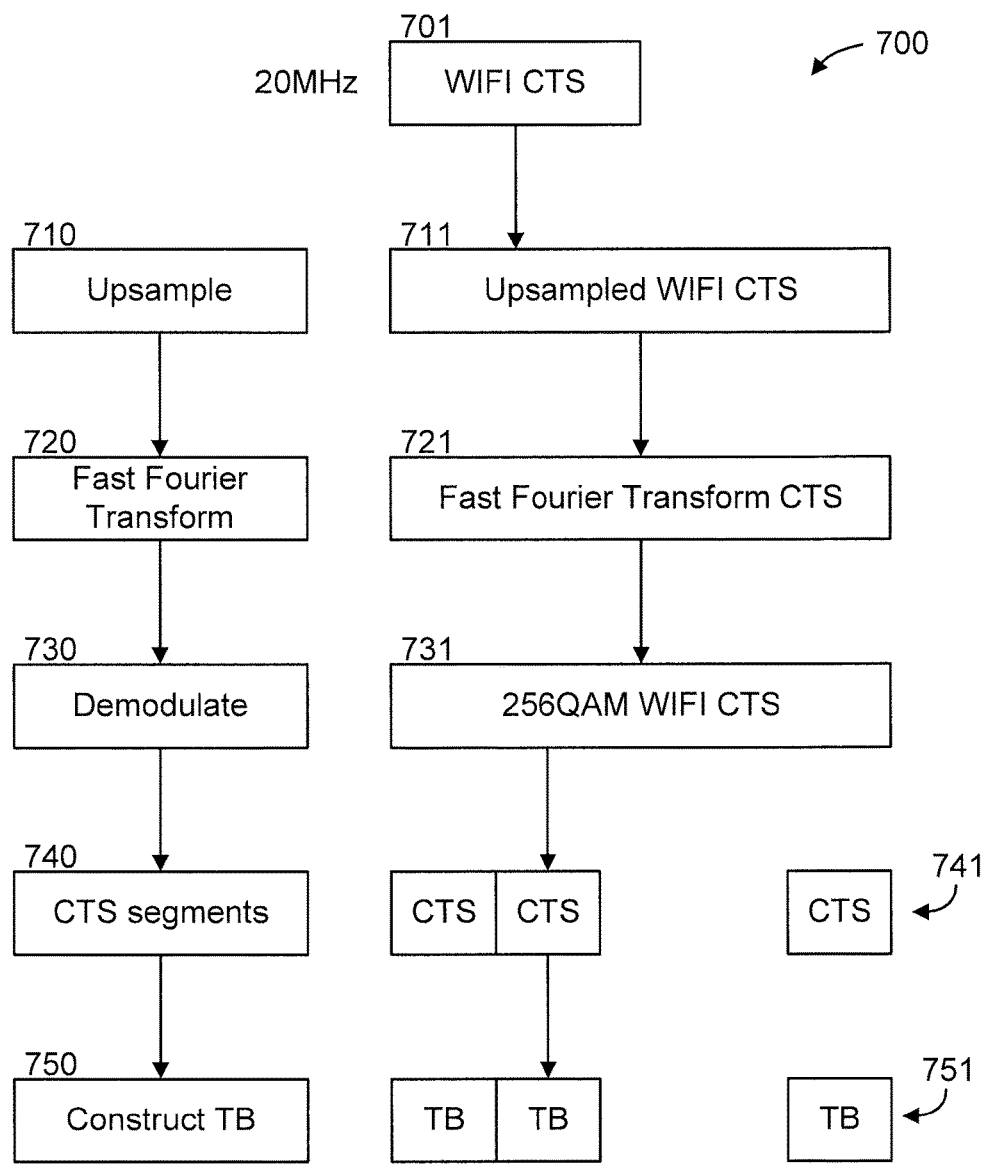
FIG. 7 shows is block diagram of an exemplary reverse engineering LTE PHY encoding 700, in accordance with an embodiment of the present invention.

Further, it is to be appreciated that processing system 100 may perform at least part of the method described herein including, for example, at least part of method 300 of FIG. 3 and/or at least part of method 400 of FIG. 4 and/or at least part of method 600 of FIG. 6 and/or at least part of method 700 of FIG. 7. Similarly, part or all of system 200 may be used to perform at least part of method 300 of FIG. 3 and/or at least part of method 400 of FIG. 4 and/or at least part of method 600 of FIG. 6 and/or at least part of method 700 of FIG. 7.

FIG. 2 shows an exemplary system 200 for enabling technologies for LTE on unlicensed spectrum, in accordance with an embodiment of the present invention.

For the sake of illustration, a single-cell 210 in an LTE network 205 includes a base station 212. According to an embodiment of the present principles, the base station 212 in the single-cell 210 serves K active users (i.e., active user equipments), $u_1$ through $u_k$, 270.

System 200 further includes a processor 220. The processor 220 performs WIFI signal embedding in LTE (see, e.g., FIG. 3) and scalable WIFI sensing in LTE (see, e.g., FIG. 4).

The processor 220 includes a storage device 230, configured to store data for facilitating the present invention as described herein.

The processor 220 further includes a downlink scheduler 225 configured to schedule downlink transmission 215 from the base station 212 to the users.

The system 200 further includes a user interface 240 connected to the processor 220 to enable a user receive the downlink transmission determined as per the downlink scheduler 225.

While shown external to the base station 212, the processor 220 can be part of the base station or implemented in a distributed configuration remote from the base station. Similarly, the user interface 240 can be part of a user equipment 270. These and other variations of system 200 are readily determined by one of ordinary skill in the art, given the teachings of the present invention provided herein, while maintaining the spirit of the present invention.

FIG. 3 shows a flow diagram of an exemplary method 300 for enabling coexistence of WIFI and Long Term Evolution (LTE) in a wireless communication system, in accordance with an embodiment of the present invention. The method 300 is performed by a base station capable of transmitting and receiving LTE frames (e.g., base station 212 of FIG. 2).

At step 310, embed, in a data sequence, a channel reservation packet that (i) is detectable by a WIFI receiver and (ii) reserves a particular one of a plurality of available unlicensed communication channels for a transmission duration of the data sequence.

In an embodiment, step 310 includes step 310A.

At step 310A, embed a WIFI CTS signal into the channel reservation packet.

In an embodiment, step 310A includes step 310A1.

At step 310A1, determine a frequency domain equivalent of the WIFI CTS signal and embed the frequency do lain equivalent as data in the channel reservation packet. In an embodiment, the frequency domain equivalent can be embedded as data in an Orthogonal Frequency-Division Multiple Access frame of the channel reservation packet.

At step 320, transmit the data sequence including the embedded channel reservation packet. In an embodiment, the data sequence can be transmitted using a Physical Downlink Shared Channel. In an embodiment, the data sequence can be transmitted using the highest available modulation rate.

In an embodiment, step 320 includes step 320A.

At step 320A, transmit the data sequence as a single Orthogonal Frequency-Division Multiple Access (OFDMA) tone capable of regenerating a WIFI detectable signal by the WIFI receiver. In an embodiment, the OFDMA tone can consist of only systematic bits of a coded sequence.

In an embodiment, step 320A includes step 320A1.

At step 320A1, partition the OFDMA tone into different partitions, and assign different ones of the different partitions to different virtual LTE users.

FIG. 4 shows a flow diagram of another exemplary method 400 for enabling coexistence of WIFI and Long Term Evolution (LTE) in a wireless communication system, in accordance with an embodiment of the present invention. The method 400 is performed by a base station capable of transmitting and receiving LTE frames (e.g., base station 212 of FIG. 2).

At step 410, sense WIFI signals in each of a plurality of frequency bands. The plurality of frequency bands correspond to a plurality of unlicensed communication channels.

In an embodiment, step 410 includes one or more of steps 410A and 410B.

At step 410A, periodically deploy a single WIFI interface on each of a plurality of unlicensed communication channels corresponding to the plurality of frequency bands to sense the WIFI signals.

At step 410B, periodically deploy a single WIFI interface on each of a plurality of unlicensed communication channels corresponding to the plurality of frequency bands to estimate a potential impact of an absence of WIFI carrier sensing on the each of the plurality of unlicensed communication channels.

At step 410C, solve a joint optimization problem based on the estimated potential impact. The joint optimization problem is for jointly performing a WIFI interface assignment and a LTE traffic allocation. In an embodiment, the joint optimization problem can determine which of the plurality of unlicensed communication channels to perform a WIFI interface channel sensing feature on that minimizes an impact of an absence of performing carrier sensing on other ones of the plurality of unlicensed communication channels.

At step 420, choose only one of the plurality of frequency bands fore a LTE transmission.

At step 430, perform LTE transmissions in other ones of the plurality of frequency bands without WIFI sensing.

A description will now be given regarding an environment to which the present invention can be applied, in accordance with an embodiment of the present invention.

As cellular networks evolve to 5G to support next generation interactive services, spectrum has undeniably been the Achilles heel in this evolution. While a move to higher frequencies like mm Wave ($\approx$30 GHz and higher) offers higher bandwidth, it is also accompanied by higher attenuation (less coverage), sensitivity and deployment cost. Hence, there has been considerable interest recently in exploring all available options under 6 GHz, of which the un-licensed bands (5 GHz) form a promising candidate.

A description will now be given relating to LTE in unlicensed spectrum. Operating in unlicensed, bands requires LTE to coexist fairly with the incumbent WIFI, the dominant technology in 5 GHz spectrum. The industry has devised two modes for LTE operation in un-licensed spectrum, namely LTE Unlicensed (LTE-U) and License Assisted Access LTE (LAA-LTE). In both modes, LTE is expected to perform energy sensing before transmission and would leverage its carrier aggregation feature to aggregate its licensed carriers (channels) with channels from the unlicensed spectrum. The key difference between the two modes is that while LTE-U (de)activates LTE in the unlicensed channels at coarse time scales ($\approx$100 ms duration), LAA-LTE is expected to operate at much finer time-scales (1-10 ms) that are comparable to WIFI transmissions.

The present invention provides a solution to address the co-existence challenge to cellular and WIFI. The present invention operates at the LTE base station and seamlessly works with legacy LTE clients. The present invention employs two key design mechanisms: (i) WIFI embedding that allows an LTE base station (BS) to transmit a WIFI control signal (specifically, PLCP preamble+header) prior to its transmission by masking itself as LTE data, and (ii) WIFI sensing that allows the LTE BS to detect WIFI control signals in packets transmitted by other Win nodes, and LTE BS s.

However, realizing the present invention's mechanisms in practice faces several challenges. First, LTE and WIFI operate at different bandwidths. For example, a 10 MHz LTE channel actually consists of a 15.36 MHz LTE signal along with a total of 5.36 MHz of guard bands. The present invention has to embed the WIFI's PLCP in its time-frequency (OFDMA) frame in a manner that will make it appear as though it originated from a WIFI node. Second, the present invention has to equip LTE with WIFI carrier sensing for every unlicensed channel it operates on without incurring hardware overhead or any changes to the LTE PHY specification.

The present invention's mechanisms address these challenges in a cost-effective manner through a novel design. For every unlicensed channel that the LTE BS operates on, the present invention determines the frequency domain equivalent of WIFI's CTS-to-self packet and embeds it as data in the OFDMA frame. This is achieved through a careful reverse-engineering of the LTE PHY, such that the time domain version of the signal accurately delivers WIFI's CTS packet to any node that employs WIFI's carrier sensing. This allows the present invention to seamlessly notify channel reservation on every un-licensed channel in a manner similar to WIFI. Enabling WIFI carrier sensing without LTE PHY modifications on every un-licensed channel, is more complicated. Here, the present invention leverages the growing trend of LTE small cells also being equipped with a WIFI interface (for dual connectivity) to re-purpose the latter for WIFI sensing alone. However, a single WIFI interface (spanning 20-40 MHz) is not sufficient to cover the numerous un-licensed channels (up to 5) that LTE can operate on simultaneously (i.e., up to 100 MHz in carrier aggregation). Hence, the present invention intelligently leverages the single WIFI interface to maximize the benefits of carrier sensing to all the un-licensed channels. It accomplishes this by periodically sensing on each un-licensed channel to estimate the fraction of WIFI traffic that is subject to impact (i.e., falls within the carrier sense threshold, say [−80, −60] dbm); uses this information to solve a joint optimization problem that helps determine the particular un-licensed channel, where the WIFI interface's carrier sensing feature would be most beneficial and hence must be deployed; along with the appropriate amount of LTE traffic load that must be placed (through flexible LTE scheduling) on each of the un-licensed channels. The joint optimization of LTE traffic placement and interface assignment to the un-licensed channels works synergistically to minimize the impact from lack of WIFI carrier sensing on all-but-one un-licensed channels.

The present invention and its mechanisms are implemented using a mixture of Universal Software Radio Peripheral (USRP) USRPs and Wireless Open-Access Research Platform (WARP) WARPs that enables LAA-LTE operation in the 5 GHz band.

The present invention can be considered to provide at least the following contributions:

The present invention identifies a critical co-existence issue between LTE-WIFI and LTE-LTE in unlicensed spectrum that stems from the lack of carrier sensing and notification features in LTE, and degrades both WIFI and LTE performance even when operating in the coexistence-friendly LAA-LTE mode.

The present invention provides the design of a novel LTE base station node that realizes the benefits of WIFI PLCP notification and detection in the un-licensed channels in a scalable, cost-effective manner, without requiring any changes to the LTE specification.

A description will now be given of an LTE frame structure. As an example, a 20 MHz LTE frame consists of 10 sub-frames, each with a duration of 1 ms. The sub-frames are made up of resource blocks (RBs). These RBs are grouped into two main physical channels: the control and the data channel. On the downlink, the control channel is known as the Physical Downlink Control CHannel (PDCCH) while the data channel is called the Physical Downlink Shared CHannel (PDSCH). PUCCH and PUSCH are the corresponding uplink control and data channels respectively. The PDCCH carries control information such as RB-to-UE (user) assignments, and synchronization (primary, PSS and secondary, SSS) signals. The synchronization signals contain cell information (group and unique cell IDs) and are carried in every other frame; when present, they appear in sub-frame 0 and 5.

A description will now be given of LTE component carriers. Each LTE-advanced eNodeB and LTE can transmit on up to five (5) distinct channels, known as component carriers (CCs) simultaneously through carrier aggregation. Each CC can have a bandwidth of 1.4, 5, 10 or 20 MHz, One of these CCs is designated as the Primary Component Carrier, which is always active and carries the PSS/SSS signals for UEs to attach to the eNodeB. The other four CCs are known as Secondary Component Carriers and can be activated/deactivated as needed.

A further description will now be given regarding LTE in unlicensed spectrum.

With LTE's always-on operation potentially starving out WIFI transmissions, the industry has devised two modes for operating LTE in unlicensed spectrum (e.g., ISM bands): LTEU and LAA-LTE. Both these modes leverage LTE's carrier aggregation feature to aggregate its licensed carriers with channels from the unlicensed spectrum, called unlicensed component carriers. LTE-U (de-)activates LTE in the unlicensed channels at coarse time scales (~100 ms duration) through a duty-cycling approach, while LAA-LTE is expected to operate at much finer time-scales (1-10 ms) that are comparable to WIFI transmissions.

Licensed-Assisted Access LTE (LAA-LTE) is under consideration by the 3GPP standardization body and requires three main changes to the existing LTE protocol.

(a) Fine-timescale non-continuous transmissions: unlicensed. CCs can transmit in to bursts of only 1-2 sub-frames at a time. Note that LAA-LTE requires a PHY-layer change to existing CCs to support this operating mode. Existing non-LAA secondary CCs can only be (de)activated over coarse timescales of tens to hundreds of milliseconds.

(b) Energy-sensing CCA: LAA-LTE employs energy-sensing for Clear Channel Assessments (CCA) before any secondary unlicensed CC transmission. If the channel is occupied (i.e., the measured energy is greater than the CCA threshold of −62 dBm) a back-off process is employed before another transmission attempt is made. Two back-off procedures are under study by the 3GPP: an exponential back-off that is the same as that used by WIFI), and a fixed back-off, where the LAA-LTE node backs off for only a fixed amount of time slots before re-attempting transmission.

(c) Partial sub-frame transmissions: LAA-LTE transmissions do not have to start/end at sub-frame boundaries. This will enable LAA-LTE eNodeBs/UEs to respond quickly to transmission opportunities.

A description will now be given regarding a LAA-LTE PHY design, in accordance with an embodiment of the present invention.

LAA LTE PHY differs from that of existing LTE in two key aspects: (a) the LAA-LTE PHY must support a per-sub-frame activation/deactivation; and (b) the LTE must be able to commence decoding from any sub-frame, rather than from only sub-frames 0 and 5. Due to these differences, existing non-LAA coarse time scale LTE) PHYs cannot be used to evaluate coexistence between LAA-LTE and WIFI. WIFI frames can be shorter than a LTE sub-frame. For example, a 1.4 KB WIFI data frame transmitted at 54 Mbps has an airtime (including MAC overhead) of under 0.5 ms. Hence, it is likely that the WIFI interference across a single LTE transmission burst of several sub-frames (1 ms per sub-frame) is time-varying. If sub-frames 0 or 5 are undecodable due to WIFI interference, then several subsequent sub-frames will also be undecodable by the UE, even if they are free of WIFI interference, which should not be the case with LAA-LTE. The measured LTE throughput with non-LAA PHYs will thus be inaccurate.

Each sub-frame in our LAA-compatible PHY carries both a Primary Synchronization Signal (PSS) and Secondary Synchronization Signal (SSS). A different cell ID is assigned to each sub-frame. This allows a UE to uniquely identify each sub-frame in a single large frame, removing the dependence on sub-frames 0 and 5.

A description will now be given regarding design components of the present invention, in accordance with an embodiment of the present invention.

Figure 5:
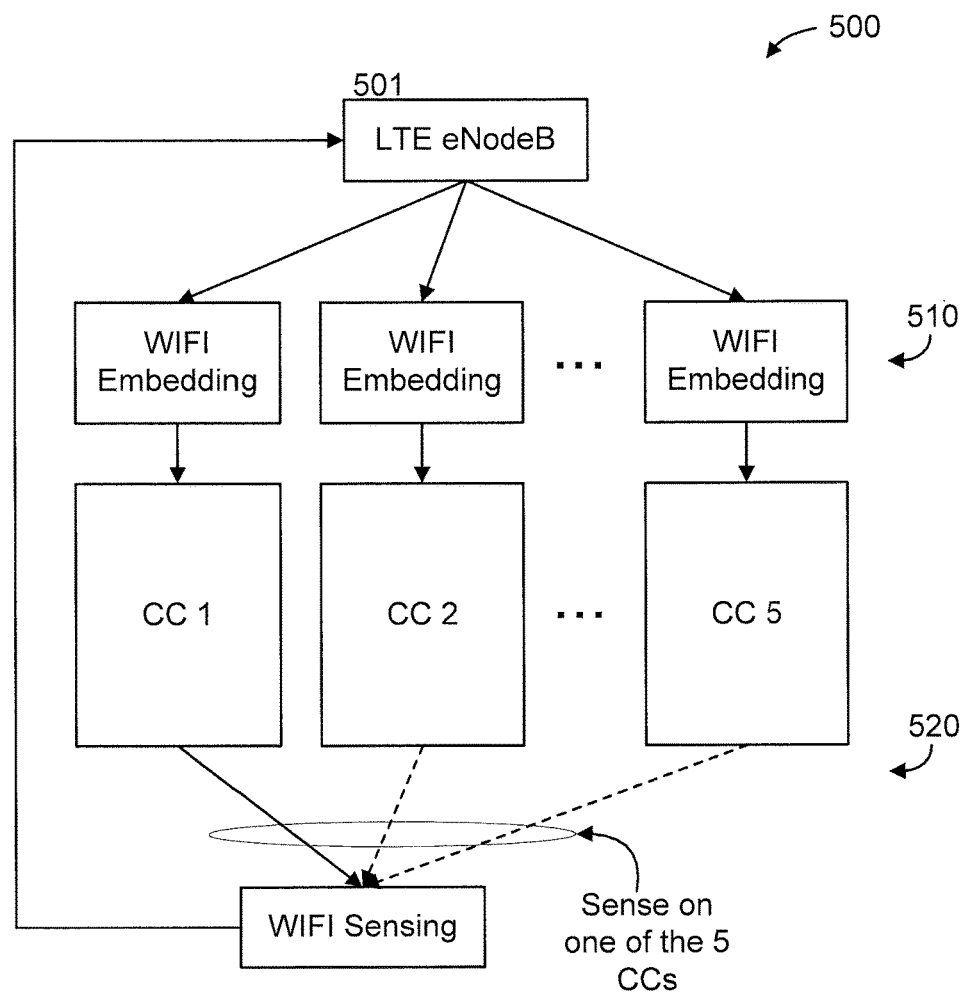
FIG. 5 shows an exemplary architecture 500 of the present invention, in accordance with an embodiment of the present invention.

With WIFI being the incumbent technology in unlicensed spectrum, we expect LTE to enable a homogeneous channel access mechanism with WIFI. To this end, a standards-compliant node is provided as shown in FIG. 5. FIG. 5 shows an exemplary architecture 500 of the present invention, in accordance with an embodiment of the present invention. The architecture 500 operates at the LTE base station (LTE eNodeB 501) and works seamlessly with legacy LTE clients. At a high level, it employs two key design mechanisms: (i) WIFI embedding 510 that allows an LTE BS to transmit a WIFI signal (channel reservation notification) prior to its transmission on each unlicensed channel by masking itself as LTE data, and (ii) WIFI sensing 520 that allows a single WIFI interface to work synergistically with the LTE traffic manager/scheduler to maximize the benefits of WIFI carrier sensing to all the unlicensed channels (CC1 through CC5).

A description will now be given regarding embedding WIFI signals in LTE, in accordance with an embodiment of the present invention.

The objective behind WIFI embedding is to allow a LAA-LTE BS to notify other WIFI/LTE nodes of its impending transmission as well as its duration in each un-licensed channel. The focus is on achieving such embedding with only changes to the LTE scheduler. This constraint is important since unlike the scheduler that is open to operator-specific modifications, the other components of the LTE stack are standardized.

Specifically, when the present invention gains access to the channel, it aims to embed the WIFI CTS-to-Self (hereafter called CTS) packet into the first sub-frame. The CTS packet would carry a NAV value, reserving the channel for the remaining duration of the LAA-LTE transmission (including the current sub-frame).

A description will now be given of LTE PHY encoding.

The encoding process of an LTE PHY for a 20 MHz channel is now described. It is emphasized that a 20 MHz LTE channel is actually transmitted at 30.72 MHz using 2048 OFDM subcarriers. Of these 2048, only 1200 subcarriers (spanning 20 MHz) is used for data transmission.

FIG. 6 shows a block diagram of an exemplary LTE PHY encoding 600 for each User Equipment (UE), in accordance with an embodiment of the present invention. In particular, FIG. 6 shows the steps taken by the LTE PHY to encode a single transport block (TB) into the resource blocks (RBs) allocated to a single UE. The scheduler sends a TB 601 of a specific size (e.g., 5992 bits), to be transmitted using a specific MCS (e.g., MCS 26 corresponds to 256-QAM), to the PHY (the TB size depends on the MCS and the number of RBs). At step 610 (CRC attach), the PHY first generates and appends a 24-bit CRC 612 to this TB 601, and sends the TB+CRC 601+612 to the turbo encoder. At step 620 (turbo encoding), the turbo encoder encodes the TB+CRC 601+612 with a fixed rate of 1/3—two parity bits are generated for every TB+CRC bit. The PHY uses a systematic turbo code, hence the output includes the original TB+CRC along with the two groups of parity bits (i.e., Parity 0 623 and Parity 1 624 in FIG. 6). At step 630 (interleaving+rate matching), the TB+CRC 601+612, along with the parity bits 623, 624, are passed to an interleaver and rate matcher. The interleaver permutates (i.e., "mixes") the TB+CRC and parity bits to guard against burst errors over the wireless channel. Rate matching then discards selected bits from both the TB+CRC and parity bits, using a process known as puncturing, so that the number of transmitted bits is suitable for the intended bitrate of the LTE PHY, thus providing rate-matched TB+CRC 631 and rate-matched Parity 0 and 1 632. At step 640 (scrambling), the interleaved/rate-matched bits are then scrambled using a sub-frame-specific scrambling sequence. This step is simply a bitwise multiplication between the interleaved/rate-matched bits and the scrambling sequence. At step 650 (modulation), the outputs 641 and 642 of the scrambling step 640 are modulated using the MCS selected data, and mapped (placed) into the subcarriers of the OFDM symbols to provide outputs 651 and 652. The sub-frames are filled one OFDMA symbol at a time. At step 660 (RB mapping+inverse Fast Fourier Transform (FFT)), the PHY performs an IFTT, cyclic prefix construction and windowing to obtain the time-domain LTE signal 661 and 662.

A description will now be given regarding interleaving and rate matching, in accordance with an embodiment of the present invention.

The interleaving and rate matching steps are important to the construction of the CTS embedding process. The 6016 bits of TB+CRC data (5992 TB and 24 CRC bits) is first rearranged into a matrix of size 188×32. The TB+CRC is written to the matrix row-wise, starting from the top left-hand corner and moving left to right, one row at a time. The LTE PHY interleaves the TB+CRC bits by exchanging pairs of columns in the 188×32 TB+CRC matrix. In the parlance of the LTE PHY, this step is known as sub-block interleaving. The Parity 0 and 1 are separately permuted in a similar manner, then rearranged into a combined 188×64 matrix. The matrices corresponding to the TB+CRC and Parity bits are then concatenated.

Rate matching is then achieved by discarding selected columns from this permuted matrix. The output of the rate-matching step is obtained by reading this concatenated matrix column-wise. The starting column depends on the redundancy value (RV) used by the PHY. This RV is a parameter that controls the LTE Hybrid ARQ (HARQ) processing. However, since we are interested in only embedding a CTS frame, we can select any convenient RV value (e.g., RV=0). With this RV value, the LTE PHY will start reading the matrix column-wise, starting from the top of the third column and moving top to bottom, left to right. This rate-matched output is then sent to the scrambler.

A description will now be given regarding reverse-engineering the time-domain CTS, in accordance with an embodiment of the present invention.

FIG. 7 shows a block diagram of an exemplary reverse engineering LTE PHY encoding 700, in accordance with an embodiment of the present invention. In particular, FIG. 7 shows the steps to embed the WIFI CTS. The steps begin with the I/Q data of a 20 MHz time-domain WIFI CTS waveform 701. Note that since this is being used to notify our channel reservation to neighboring WIFI devices, only the NAV parameter in the CTS is important. Our 20 MHz time-domain CTS signal consists of 1333 I/Q samples. At step 710, these time-domain I/Q samples are then up-sampled to 30.72 MHz, which is the actual sampling rate of a 20 MHz LTE channel to provide an up-sampled waveform 711. This up-sampled waveform 711 has 2048 I/Q samples. At step 720, an FFT is performed on this waveform to obtain a frequency-domain representation 721 of the up-sampled CTS. At step 740, CTS segmentation is performed to obtain CIS segments 741. At step 750, transport block (TB) construction is performed to obtain TBs 751.

A description will now be given regarding reducing the quantization noise.

Note that even though the signal was up-sampled, the signal energy is still limited to the middle 20 MHz of the LTE bandwidth. Hence, only a total of 1200 frequency-domain I/Q samples centered about the DC subcarrier is used. Each of these frequency-domain I/Q samples are then quantized to the nearest 256 QAM modulation point 256 QAM is used to minimize the quantization noise added to the signal. The resulting quantized samples are then demodulated to obtain the corresponding bits. These bits are partitioned 13 CTS segments. The Choice of 13 segments forms an important role in successfully embedding a WIFI CTS frame.

A description will now be given regarding constructing the transport blocks, in accordance with an embodiment of the present invention. A transport block (TB), which is the eventual data given to the scheduler, is constructed from each CTS segment by reverse-engineering the encoding process. The design of this transport block is key to successfully embedding a WIFI CTS packet. The original TB can thus be constructed by inverting three of the PHY stages, namely scrambling, rate matching and permutation, and interleaving, in that order.

Regarding descrambling, recall that the scrambling sequence is sub-frame specific. ULTRON regenerates this sub-flame-specific scrambling code, and recovers the pre-scrambled signal by performing a bit-wise addition in GF2 (i.e., a Galois field of 2 elements) of the scrambling code and the zero-padded CTS segment.

Regarding de-rate-matching, the de-scrambled output is written to the first 32-columns of the rate-matching matrix, starting from the top of the third column, and moving from top to bottom, left to right. The first two columns are filled with zeros. Note that we begin filling the matrix from the third column (not the first) since the CTS will be embedded with the parameter RV=0.

Regarding de-interleaving, the interleaver is a one-to-one map using a fixed permutation pattern. Hence, a reverse map can be easily constructed from the interleaved TB+CRC back to, the original TB. The de-interleaved TB+CRC can be recovered by reading the matrix row-wise, starting from the top left-band corner of the matrix, and moving from left to right, top to bottom. At this point, the scheduler has constructed the TB that needs to be sent to the PHY for generating a CTS packet.

A description will now be given regarding CTS placement, in accordance with an embodiment of the present invention.

Figure 8:
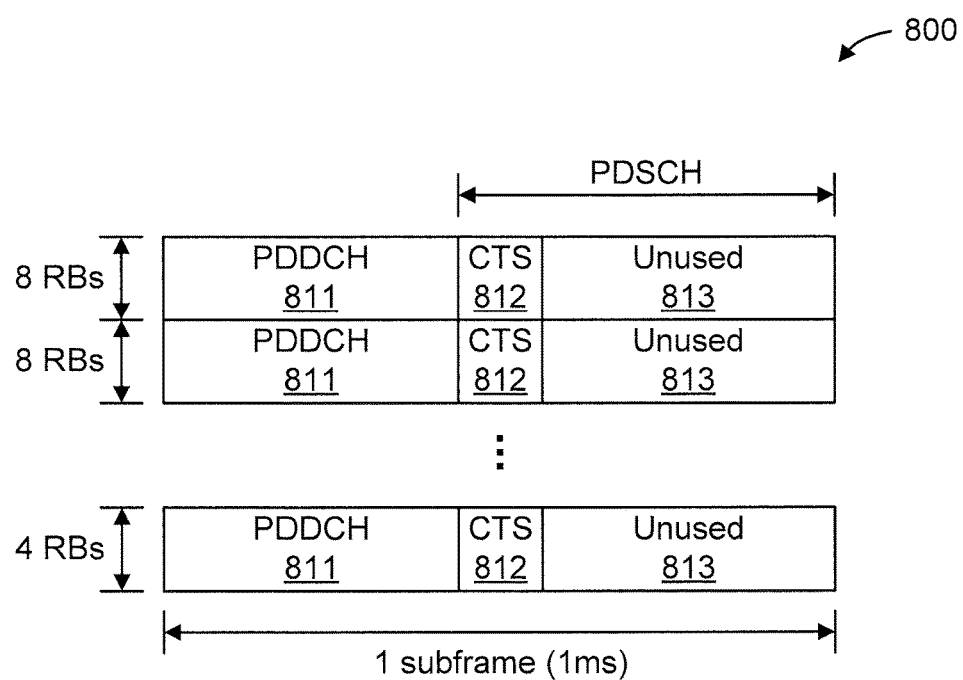
FIG. 8 shows a block diagram of an exemplary WIFI CTS embedded in the first OFDMA symbol of PDSCH, in accordance with an embodiment of the present invention.

FIG. 8 shows a block diagram of an exemplary WIFI CTS embedded in the first OFDM A symbol of PDSCH, in accordance with an embodiment of the present invention. In particular, FIG. 8 shows constructed transport blocks (corresponding to the CTS) placed in a 20 MHz LTE sub-frame. Only one WIFI CTS 812 is embedded in each sub-frame. This CTS is placed only in the first OFDMA symbol of the PDSCH. The rest of the sub-frame 813 is left unused, since any data placed there will be corrupted by the embedded CTS. The PDCCH of the LTE sub-frame carrying the embedded CTS is configured to use a single OFDMA symbol, which is for the PDCCH 811. This ensures that the CTS is transmitted as soon as possible in the second OFDMA symbol, which does not carry any LTE reference signals. Hence, all subcarriers in this second symbol will be used to embed the CTS frame.

An explanation is now provided of the rationale behind generating 13 transport blocks, each meant for a different UE, to embed the CTS. Note that these UEs can be virtual UEs as the LTE PHY does not validate the UE identities. While one might consider generating a single large TB (covering the entire CTS) destined to a single UE, when the size of the TB+CRC exceeds the LTE limit of 6144 bits, the PHY will partition the TB+CRC into smaller code-blocks. This will generate an additional CRC that gets appended to, each of these code blocks. With the allocation of bits to UE moving from top-to-bottom, one symbol at a time, these additional CRCs will appear in between the code blocks on the same LTE symbol, thereby leading to a distortion of the final time-domain CTS waveform. Hence, to retain the contiguity of bits (capturing the entire CTS) in the same LTE symbol, the present invention limits the size of each TB to 5992 bits (<6144 bits). This coupled with the choice of 256 QAM for these bits, results in a corresponding requirement of 8 RBs in a TB. In a 20 MHz LTE transmission, which includes 100 RBs per sub-frame, ULTRON assigns these RBs to 13 UEs: 12 UEs with 8 RBs each, and one UE with 4 RBs. Thus, while each UE's TB only captures a part of the CTS in its PDSCH (its CRC appears in the next symbol), the contiguity of the 13 TBs on the same LTE symbol, allows a WIFI device to decode the entire CTS without any knowledge of the LTE transmission. The use of 13 TBs is just one possible realization of the encoding process. A different number of TBs may be employed, as long as the size of the TB is such that no partitioning of TB bits by the PHY is performed.

A description will now be given regarding scalable WIFI sensing in LTE, in accordance with an embodiment of the present invention.

The present invention has to equip LTE with WIFI carrier sensing for every unlicensed channel it operates on without incurring any changes to the LTE PHY specification. While providing a WIFI sensing module (through a WIFI interface) for every un-licensed channel is an option, this is not a scalable solution. Note that LTE-advanced can currently aggregate up to five carriers/channels (licensed and/or unlicensed) through carrier aggregation, which in future 5G networks will only increase in number. On the other hand, LTE small cells are increasingly being equipped with a WIFI interface (although just one) for features such as dual connectivity communicating with both macro and small cell concurrently), which in turn could be re-purposed for WIFI carrier sensing. However, a single WIFI interface (spanning 20-40 MHz) is not sufficient to cover the numerous un-licensed channels that LTE can operate on simultaneously (i.e., up to 100 MHz in carrier aggregation).

In addressing this challenge, the present invention intelligently leverages the single WIFI interface to maximize the benefits of carrier sensing to all the un-licensed channels. It accomplishes this through a two-step process. First, it deploys the WIFI interface on each of the un-licensed channels periodically (for $t_s$ seconds) to sense and estimate the potential impact of not having WIFI carrier sensing on that channel. Second, it uses this information to solve a joint optimization problem that helps determine the particular un-licensed channel, where the WIFI interface's channel sensing feature would be most beneficial, along with the appropriate amount of LTE traffic load that must be placed on each of the unlicensed channels. The present invention operates using this optimized configuration for an epoch of T seconds (T>>$t_s$) before sensing each of the channels again so as to track the traffic variations in the network and determine the appropriate configuration for the next epoch.

A description will now be given regarding estimating the impact of carrier sensing, in accordance with an embodiment of the present invention.

When the WIFI interface is deployed on an un-licensed channel i, its carrier sensing feature is used to listen to the WIFI packets on the channel and collect the following coarse-grained statistics over the measurement period of $t_s$ seconds: (i) average number of contending nodes, $n_i$; channel occupancy fraction, $y_i$; and (ii) channel occupancy fraction due to traffic that cannot be detected with just energy sensing but can cause interference, $\hat{y}_i$ (i.e., those packets falling below the energy sensing threshold but over the carrier sense threshold, say [−80, −60] dBm).

A description will now be given regarding maximizing the benefits carrier sensing, in accordance with an embodiment of the present invention.

Regarding maximizing the benefits of carrier sensing, a problem formulation will now be given. While the WIFI interface can provide carrier sensing capability to only one of the un-licensed channels in real-time, the information collected by it during the measurement period can be used to minimize the impact from lack of carrier sensing in other channels. This is achieved through an intelligent allocation of LTE traffic to the unlicensed channels, which is made possible through LTE's flexible scheduling mechanism that allows traffic to be jointly scheduled across multiple channels. The WIFI interface assignment as well as the LTE traffic allocation to all the unlicensed channels is made jointly through the following optimization problem, IATA (Interface Assignment and Traffic Allocation).

$$IATA: \text{Maximize} \sum_i z_i x_i + (1 - z_i) \max\{0, x_i - \hat{y}_i TR_i\}$$

$$\text{Subject to } \sum_i z_i \leq 1$$

$$\sum_i x_i \leq L$$

$$x_i \leq R_i \cdot \max\left\{T(1 - y_i), \frac{T}{n_i}\right\}, \forall i$$

where $R_i$ denotes the average LTE transmission rate (bits/s) on channel i as measured during LTE transmissions from the previous epoch, and L is the total LTE load (in bits per epoch T s) to be sent across the unlicensed channels. $y_i$ and $\hat{y}_i$ are as defined above. $z_i$ and $x_i$ are output, variables indicating the allocation of WIFI interface to channel i ($z_i \in \{0,1\}$) and the amount of LTE traffic allocated to channel i respectively. The objective is to maximize the successful transmission of the LTE traffic load on the unlicensed channels. While the LTE traffic assigned to the channel that receives the WIFI interface will be protected ($z_i x_i$), the lack of the WIFI interface on a channel will result in collision and hence loss of LTE traffic up to an amount ($\hat{y}_i$, T, $R_i$) determined by the aggregate un-detected, interference-causing traffic, $\hat{y}_i$, T) in the worst case. The first two constraints indicate the binary nature of the interface assignment variable, and the bound on the LTE traffic that needs to be served on the unlicensed channels respectively. The third constraint captures the maximum amount of LTE traffic that can be allocated to a channel based on its fair share of channel occupancy (i.e.

$$\frac{T}{n_i}$$

when channel is saturated) as well as un-used channel occupancy (i.e., $T(1-y_i)$ when not saturated).

A further description will now be given regarding the approach of the present invention, in accordance with an embodiment of the present invention.

The above non-linear optimization problem can be easily shown to be NP-hard. Even when the WIFI interface assignment is given, the remaining problem of LTE traffic allocation is NP-hard and corresponds to a modified version of a knapsack problem. Hence, the present invention adopts the following greedy heuristic that is computationally light-weight but is highly effective in practice.

Step I: Solve IATA M times, where M is the number of unlicensed channels. In each iteration j, solve IATA assuming the WIFI interface is assigned to channel j (i.e., $z_{i=j}=1$; $z_{i\neq j}=0$) and determine the LTE traffic allocation to all the unlicensed channels. Let IATA(j) be the resulting objective value with the corresponding output being ($z_j x_j$), where $z_j=[z_1, \ldots, z_m]$ and $x_j=[x_1, 000, x_m]$.

Step II: Pick the solution ($z^*$, $x^*$) that yields the highest objective value, i.e., $$(z^*, x^*) = \arg\max_{(z_j x_j)} IATA(j) \quad (1)$$

LTE Traffic Allocation: Step I is now further described, where given the assignment of the WIFI interface to one of the un-licensed channels (say j), the intent is to determine the LTE traffic allocation across all the unlicensed channels. Note that with the protection of WIFI carrier sensing on channel j, it is straight-forward to see that maximum traffic that is allowed by that channel (or limited by the input traffic) would be allocated to it, i.e., $$x_j = \min\{L, R \cdot \max\{T\left(1 - y_j, \frac{T}{n_j}\right.$$

The problem now reduces to determining the allocation for the remaining un-licensed channels that do not have the carrier sensing feature.

$$IATA(j): \text{Maximize} \sum_{i \neq j} \max\{0, x_i - \hat{y}_i TR_i\} \quad (2)$$

$$\text{Subject to } \sum_{i \neq j} x_i \leq L - x_j$$

$$x_i \leq R_i \cdot \max\left\{T(1 - y_i)\frac{T}{n_i}\right\}, \forall i \neq j$$

The intent here is to pack (allocate) the remaining LTE traffic ($L-x_j$) into bins (channels) with capacity $$c_i = R_i \max\left\{T(1 - y_i)\frac{T}{n_i}\right\}, .$$

When a bin i is chosen, it incurs a cost (loss due to lack of carrier sensing) of $l_i=\hat{y}_i TR_i$. Hence, the goal is to pick a subset of the bins such that maximum amount of LTE traffic can be successfully served, while accounting for the loss. Being a variant of the minimum cost knapsack problem, it is hard to solve this problem optimally. Hence, the following heuristic is designed, where the channels are sorted based on their normalized traffic loss, and use it to determine an appropriate subset of channels for allocation.

$$\frac{l_i}{c_i}.$$

Step 1: Sort the channels in non-decreasing older based on the metric Channels that provide higher capacity with low loss will appear earlier in the order. Let the ordering be $$l_1/c_1 \leq \frac{l_2}{c_2} \leq l_m/c_m.$$

Step 2(a): Let $m_1$ be the index, where the aggregate capacity of channels in the ordering just exceeds the input traffic, i.e., $$\sum_{i=1}^{m_1} c_i < L - x_j \leq \sum_{i=1}^{m_1+1} Ci$$

Define $A_1=(1,2 \ldots m_1)$. Hence, channels corresponding to indices $(1, 2, \ldots, m_1 m_1+1)$ form a potential solution with a net successful LTE traffic allocation of $L-x_j-\Sigma_{i=1}^{m_1+1} l_i$.

Step 2(b); Similar to $m_1+1$, if the subsequent indices (k $\in\{m_1+2, m_1+3, \ldots\}$) provide net capacity that exceeds the input traffic, i.e., $\Sigma_{i=1}^{m_1} c_i + c_k \geq L-x_j$, then each of the channels corresponding to k are also potential solutions, whose value is recorded.

Step 2(c): Let $m_2$ be the first next index, when net capacity falls below the input traffic, i.e., $\Sigma_{i=1}^{m_1} c_i + c_{m_2} < L-x_j$. Let $m_3$ be the subsequent index, where the net capacity again first exceeds the input traffic (similar to step 2(a)), i.e., $\Sigma_{i=1}^{m_1} c_i + \Sigma_{i=m_2}^{m_3} Ci < L-x_j \leq \Sigma_{i=1}^{m_1} c_i + \Sigma_{i=m_2}^{m_3} Ci$ Let $A_2=(m_2, m_2+1, \ldots, m_3)$. Now, $A_1 \cup A_2 \cup U\{m_3+1\}$ forms a potential solution as well.

This process continues by repeating Step 2 over the remaining channels in the ordered list. Once the entire list is traversed, the best of all the potential solutions is picked as the solution delivering the maximum successful LTE traffic allocation. The algorithm is light-weight and incurs a time complexity of O(M log M).

The above joint optimization demonstrates the synergistic role of LTE traffic placement (scheduling) and WIFI interface assignment to minimize the impact from lack of WIFI carrier sensing on all-but-one un-licensed channels.

A description will now be given regarding competitive/commercial values of the solution achieved by the present invention.

The present invention is capable of efficiently addressing the problem of coexistence of WIFI and LTE in several frequency bands. Moreover, the present invention is standard compliant and, thus, there is no need to change or modify the standard to operate with the present invention.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or an instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for enabling coexistence of WIFI and Long Term Evolution (LTE) in a wireless communication system, the method comprising:
   embedding in a data sequence, by a base station capable of transmitting and receiving LTE frames, a channel reservation packet that (i) is detectable by a WIFI receiver and (ii) reserves a particular one of a plurality of available unlicensed communication channels for a transmission duration of the data sequence; and
   transmitting, by the base station, the data sequence including the embedded channel reservation packet;
   wherein the data sequence is transmitted as a single Orthogonal Frequency-Division Multiple Access (OFDMA) tone capable of regenerating a WIFI signal detectableby the WIFI receiver, and
   wherein the single OFDMA tone consists of only systematic bits of a coded sequence.

2. The method of claim 1, wherein the WIFI CTS signal is embedded into the channel reservation packet by determining a frequency domain equivalent of the WIFI CTS signal and embedding the frequency domain equivalent as data in the channel reservation packet.

3. The method of claim 1, wherein a frequency domain equivalent is embedded as data in an Orthogonal Frequency-Division Multiple Access frame of the channel reservation packet.

4. The method of claim 1, wherein the data sequence is transmitted by the base station using a Physical Downlink Shared Channel.

5. The method of claim 1, wherein a highest available modulation rate is used to transmit the data sequence including the embedded channel reservation packet.

6. A method for enabling coexistence of WIFI and Long Term Evolution (LTE) in a wireless communication system, the method comprising:
   embedding in a data sequence, by a base station capable of transmitting and receiving LTE frames, a channel reservation packet that (i) is detectable by a WIFI receiver and (ii) reserves a particular one of a plurality of available unlicensed communication channels for a transmission duration of the data sequence; and
   transmitting, by the base station, the data sequence including the embedded channel reservation packet;
   wherein the data sequence is transmitted as a single Orthogonal Frequency-Division Multiple Access (OFDMA) tone capable of regenerating a WIFI signal detectable by the WIFI receiver, and
   wherein the single OFDMA tone is partitioned into different partitions, and wherein different ones of the different partitions are assigned to different virtual LTE users.

* * * * *